Patented Dec. 15, 1936

2,063,987

UNITED STATES PATENT OFFICE 2,063,987

AMINO CARBOXYLIC ACID CONDENSATION PRODUCTS AND PROCESS OF MAKING THEM

Henry Dreyfus, London, England

No Drawing. Application August 22, 1932, Serial No. 629,902. In Great Britain September 18, 1931

5 Claims. (Cl. 260—99.12)

This invention relates to improvements in the wet treatment of materials and more particularly in the wetting, cleansing, sizing, de-electrification and other wet treatments of textile materials, in cleansing broadly, and in the wetting, dispersing and emulsifying of water-insoluble compounds or materials.

I have discovered that the compounds obtainable by acidylation and/or esterification of the amino or acid groups of amino acids, and particularly aliphatic amino carboxylic acids and also the salts of these compounds formed either on the amino group or the acid group, whichever is free, are of great value for aqueous treatments of all kinds, and in particular in the wetting, cleansing, sizing, de-electrification, prevention of acid fading of dyestuffs, creping and other treatments of textile filaments, threads, yarns, fabrics and the like and also in the dispersion, emulsification and wetting of difficultly wettable or water-insoluble substances and materials of all kinds.

The parent amino acids for the manufacture of the agents to be used for wetting, emulsifying and other purposes may, for example, be simple amino acids, as for example glycine, $\alpha$- and $\beta$-alanines, $\alpha$-amino isobutyric acid, ornithine ($\alpha$-$\delta$-di-amino-valeric acid), valine ($\alpha$-amino-iso-valeric acid), lysine ($\alpha$-$\epsilon$-di-amino-capronic acid), leucine, ($\alpha$-amino-$\gamma$-methyl-butyric acid) or the derivatives of such acids, as for example the N-alkyl derivatives, e. g., sarkosin (N-methyl glycine), butyl-glycine, including carboxy alkyl derivatives of amino acids, as for instance diglycol amino acid (carboxy methyl glycine) and oxy derivatives, as for example serine ($\alpha$-amino-$\beta$-oxy-propionic acid).

These parent amino acids may be very readily prepared by the action of ammonia or an alkylamine or other base upon the addition products, cyanhydrins, of hydrocyanic acid and an aldehyde or a ketone or an alkylene oxide, as for instance formaldehyde, acetaldehyde, glycol aldehyde, acetone or ethylene oxide, followed by hydrolysis or saponification. The ammonia or like base produces an amino nitrile which is saponified to the corresponding amino acid. The reagents need not necessarily be brought together in the above order, and in fact, for instance, the aldehyde, the ammonia and the hydrocyanic acid may be mixed together initially or the aldehyde and the ammonia may be used in the form of an aldehyde-ammonia or in the form of hexamethylene-tetramine. Again the ammonia or susbtituted ammonia, as for instance methylamine, ethylamine or butylamine, may be applied in aqueous solution, in alcoholic solution or in aqueous alcoholic solution. The saponification or hydrolysis may be brought about with the aid of bases or acids, as for example with caustic soda, baryta or hydrochloric acid, and may even take place simultaneously with the treatment with ammonia or other amidating agent.

The amino acids obtained from paraffins and from tar and coal hydrogenation products, for example by chlorinating the oxidation products of such hydrocarbon bodies followed by amidation with amino or substituted amino (e. g. methylamino) groups, and the amino acids obtainable by reduction of the products obtained by treating said hydrocarbons with nitrogen oxides are also of value as the parent amino acids for the manufacture of the compounds of the present invention.

The amino acids may be converted into the compounds for use according to the present invention by acidylation of the amino group, particularly with higher fatty acid radicles, for instance radicles containing 8 and preferably 12, 16 or more carbon atoms or by naphthenic acid radicles or resin acid radicles. Valuable results are obtained, for example by introducing the radicles of lauric, stearic, palmitic and oleic acids among the fatty acids, naphthenic acids and the resin acids of colophony, Congo copal, kauri copal, manila copal and Zanzibar copal, and the synthetic resin acids, for example those obtainable by condensation of natural resins with phenol-aldehyde condensation products and with other synthetic resin products, as for example the glyptal and urea-aldehyde synthetic products and the products obtained from aliphatic di-carboxylic acids, e. g. sebacic acid, by condensation with alcohols, and in addition the purely synthetic resins containing a free carboxy group, for example the products obtained by condensation of salicylic acid or other phenol carboxylic acids with formaldehyde or other aldehydes. The compounds of the present invention may further be obtained by esterification of the carboxy groups of the amino acids and particularly esterification by means of higher alcohol radicles, as for example iso-amyl alcohol, cetyl alcohol or myricyl alcohol. Most of these compounds are new and their manufacture forms an important part of the present invention. While, for instance, the simple methyl or ethyl esters of the amino acids are known, these are of comparatively small value according to the present invention, and the higher alcohol esters, as for instance the isobutyl, isoamyl and higher esters have a much greater wetting, emulsifying, or dispersing power. Compounds may further be obtained by acidylation of the amino groups and esterification of the acid groups.

It is found that the wetting, emulsifying and dispersing power increases with the number of carbon atoms, and it is advisable in all cases to employ compounds which contain at least 12-16 and preferably 20 or more carbon atoms. These carbon atoms will be partly present in the amino acid itself and partly present in either the acidyl group or the ester group or both. Even when the amino acid itself contains a large number of carbon atoms it is advisable to employ for the acidylation or esterification an acid or an alcohol containing at least 4 carbon atoms, and preferably 8, 10 or more carbon atoms.

The acidylation may be brought about by treatment of a primary or secondary amino acid with the acid itself or with an ester thereof, e. g. a glyceride, or with the acid chloride or acid anhydride. A treatment with an acid chloride may take place in the presence of pyridine or like base, and a treatment with an acid or ester or an anhydride may take place in the presence of condensing agents, as for example sulphuric or phosphoric acid or zinc chloride. Heating may be unnecessary in the case of using an anhydride but is preferable in the case of employing the acid itself or an ester thereof to effect the acidylation. Similarly in esterifying the carboxy group of the amino acids, condensing agents, as for instance sulphuric acid, hydrochloric acid or phosphoric acid, may be employed with or without appropriate heating.

The invention includes the use for the purposes stated above not only of the simple acidyl and ester derivatives of the amino acids, but also the mixed acidyl and ester derivatives and the salts of the amino acid esters, for example the salts with hydrochloric acid or other relatively strong acid and also the salts of the acidyl amino acids, for instance the ammonium, sodium or potassium salts and the amino alcohol salts, for instance the salts formed with mono-, di-, and tri-ethanolamine, propanolamine, di-amino-propanol, dioxy-propanolamine, butanolamine, pentanolamine and the like and the salts formed with aliphatic diamines, as for instance ethylene diamine.

Instead of using a simple alcohol for the esterification of carboxy groups in the amino acids, substituted alcohols may be used, as for instance the amino alcohols mentioned above. In such a case, salt formation may be effected with both amino groups. Similarly, di- or polyhydric alcohols such as ethylene glycol, propylene glycol, diethylene glycol and glycerine may be used.

Further, the present invention includes the manufacture and use of the sulphonation products of all the above substances. Such sulphonation may be effected either after, during or before effecting acidylation or esterification of an amino carboxylic acid. Thus an already sulphonated amino carboxylic acid may be condensed with a suitable fatty acid or other acid or with an alcohol, or an unsulphonated amino acid may be condensed with a sulphonated fatty acid (which term includes the sulphation products as well as the true sulphonation products of fatty acids) or other sulphonated acid or with a sulphonated alcohol. It is preferable to effect the sulphonation simultaneously with or after the acidylation or esterification. The sulphonation may be effected by simple treatment with strong sulphuric acid, preferably with warming, or by treatment with chlor-sulphonic acid or with sulphur trioxide. The stronger sulphonating agents, such as chlor-sulphonic acid and sulphur trioxide, have the advantage that they produce highly sulphonated products. Where there is the possibility of obtaining either a sulphation product or a sulphonation product, the chlor-sulphonic and sulphur trioxide sulphonating agents tend to produce the true sulphonic acid. The sulphonation products are all novel and their manufacture constitutes a feature of the invention. In general they are even more stable towards hard water than are the simple unsulphonated products, and for this reason they are more valuable for use according to the invention.

As previously indicated, the new products are especially of value as wetting, cleansing, emulsifying and dispersing agents and as de-electrifiers in the arts. Some of the products lend themselves more particularly to one purpose and other products to other purposes. The products obtained by acidylation of the amino group or groups of an amino acid and also the salts of such products are of great value as dispersing, wetting and cleansing agents. The products obtained by esterification of the carboxy groups of amino acids with an amino alcohol and also the other simpler esters of the amino acids, especially the esters produced by partial esterification of a glycol or other polyhydric alcohol with an amino acid, are of great value as de-electrifiers. They may be used either as such or in the form of salts, for example with hydrochloric acid. The products containing free amino groups are especially of value as agents for preventing acid fading of dyestuffs on textile materials, particularly on materials consisting of or containing cellulose acetate or other organic derivatives of cellulose which have been or are to be coloured by means of amino-anthraquinones or alkyl-amino-anthraquinones.

Furthermore, these agents and also the acidyl amino acids and their salts have pronounced lubricating properties and can therefore be used as lubricants in weaving, knitting, winding or winding and twisting generally, and especially winding or winding and twisting of artificial filaments, for example continuously with their production, either by dry or wet spinning processes. In wet spinning the products may actually be incorporated in the coagulating bath and may be carried out of the bath by the filaments or like products, so as to exert their lubricating action. Inasmuch as these products may be used instead of the known lubricants which are subject to oxidation to produce acidic bodies, they may be said to be capable of eliminating the cause of acid fading of dyestuffs on textile materials.

All the compounds of the present invention and more especially the sulphonation products and also the products containing free carboxy groups, whether sulphonated or not, and whether or not the carboxy group has been neutralized with ammonia, caustic soda, caustic potash or other base, may be used as wetting, emulsifying and dispersing agents for difficultly wettable or water-insoluble solids of all kinds. For example, they may be used in the treatment of such solids so as to form pastes, for example printing pastes for use in the colour industry, and in commercial pastes containing vat and other insoluble dyes which have subseqently to be converted into solutions or dispersions. In the textile industries the products are of value in any wet treatment of textiles, as for example in mercerizing of cotton and other cellulosic fibres, dyeing of fibres of all kinds, the fulling of wool, the carbonizing of cotton and cellulosic fibres, and the killing of skins.

As wetting agents the substances are further of importance in the crepe twisting of artificial and other filaments or yarns in order to produce crepe fabrics. It is of great assistance in crepe twisting to apply water or other wetting substance before twisting or during twisting or between the stages of twisting. The agents of the present invention facilitate such wetting. Furthermore, in the manufacture of staple fibre, using for instance artificial filaments and especially filaments of cellulose acetate or other organic derivatives of cellulose, it is of advantage to cut a compact bundle of filaments which has been wetted with water. Such wetting may again be facilitated by means of the substances of the present invention.

As dispersing agents the products are particularly of value in the conversion of water-insoluble dyestuffs into dispersions for use in dyeing, printing and stencilling of textile fibres, and in particular fibres of cellulose acetate or other organic derivatives of cellulose, for which the water-insoluble dyestuffs are today of most value. The products may also be used for the purpose of dispersing lakes, insoluble pigments and pigment dyestuffs into suitable dispersions for use as aqueous paints and the like.

As de-electrifiers the products have most importance in connection with textile fibres which are liable to electrification, as for example silk, wool and the organic esters and ethers of cellulose, and also in the treatment of films, sheets and the like of esters or of ethers of cellulose or other substances which are liable to electrification. In the case of artificial filaments or other materials such as those made of cellulose derivatives the de-electrifiers of the present invention may be applied to the materials after manufacture or dissolved or dispersed in the solutions used in the manufacture of the materials.

While in the above description particular examples have been given of wet treatments of textiles, powdered solids and other materials, it will be appreciated that the invention is by no means limited thereto. Similarly, particular examples have been given of agents to be used and manufactured according to the invention, but it is to be understood that the invention includes broadly the use of products obtained by acidylation and/or esterification of amino acids and the salts of such products, and also the manufacture of these products and particularly of products which contain a relatively large number of carbon atoms, for instance 4 or 6 or more carbon atoms, in the acidyl or ester groups in addition to those present in the parent amino acid. Furthermore, instead of using the condensation products of the amino acids with higher fatty acids or other acids as dispersing, wetting or emulsifying agents, de-electrifiers and the like, I have found that the simple addition products and their salts may be used. Preferably the salt of the amino acid is allowed to react with or add itself to the higher fatty acid or other acid.

The following examples of the preparation and use of the products obtained according to the present invention are given by way of illustration, but it is to be clearly understood that they do not limit it in any way:—

Example 1

89 parts of sarkosin are refluxed with 150-200 parts of naphthenyl chloride in the presence of an acid binding agent, e. g. pyridine. When the reaction is substantially complete, the mixture may be fractionated, and the condensation products, either in a crude form or purified, may be employed as a dispersing, wetting or cleansing agent.

Example 2

A mixture of 178 parts by weight of alanine and about 90-100 parts of glycerine is heated in about 50% sulphuric acid with good stirring at 100-150° C. The condensation product obtained may be employed for de-electrifying or lubricating.

Example 3

The isoamyl ester of glycine, obtained by passing hydrochloric acid gas into a suspension of glycine hydrochloride in isoamyl alcohol, followed by fractional distillation, is reacted with a small excess of stearyl chloride in the presence of an alkaline medium, e. g. pyridine. The isoamyl glycine stearate obtained is then separated and may be employed as a wetting or dispersing agent or for any other suitable purpose.

Example 4

By reacting an approximately equimolecular mixture of glycine, oleic acid and concentrated sulphuric acid, and maintaining the temperature at 100-150° C. a sulphonated glycine oleic acid compound may be obtained which is of value for the purposes of the present invention.

Example 5

The following example shows the use of the products of the present invention in the dyeing of artificial silk.

1½ ounces of 1-methylamino anthraquinone are ground with about four times its weight of the sodium salt of the sarkosin naphthenate obtained according to Example 1, and the mixture is well stirred into about 30 gals. of water at 30-35° C. 10 lbs. of cellulose acetate yarn in hank form are then entered, the temperature raised very slowly to 75-80° C. and the goods worked until the desired shade is obtained. They are then removed, rinsed and dried, or treated in any other desired manner.

Example 6

Cellulose acetate filaments or yarns are passed through or otherwise impregnated with a 1.5% solution of the sodium salt of the compound obtained according to Example 4, and are found to have improved properties for textile processes.

What I claim and desire to secure by Letters Patent is:—

1. Process for the manufacture of organic compounds, which comprises condensing a compound selected from the group consisting of aliphatic amino-carboxylic acids containing more than one carbon atom and their esters with a compound selected from the group consisting of resin acids and their esters, anhydrides and acid chlorides to form an amide containing at least twelve carbon atoms.

2. Process for the manufacture of organic compounds, which comprises condensing a compound selected from the group consisting of aliphatic amino-carboxylic acids containing more than one carbon atom and their esters with a compound selected from the group consisting of resin acids and their esters, anhydrides and acid chlorides to form an amide containing at least twenty carbon atoms.

3. Process for the manufacture of organic compounds, which comprises reacting a compound selected from the group consisting of aliphatic amino-carboxylic acids containing more than one carbon atom and their esters with an acidylating agent selected from the group consisting of resin acids and their esters, anhydrides and acid chlorides, to form an amide containing at least twenty carbon atoms, and with a sulphonating agent.

4. Compounds containing at least twelve carbon atoms which are amides of resin acids and compounds selected from the group consisting of aliphatic amino-carboxylic acids containing at least one carbon atom and their esters.

5. Compounds containing at least twenty carbon atoms which are amides of resin acids and compounds selected from the group consisting of aliphatic amino-carboxylic acids containing at least one carbon atom and their esters.

HENRY DREYFUS.